United States Patent [19]  [11] 4,190,977
Casper  [45] Mar. 4, 1980

[54] FOREARM REST FOR FISHING RODS

[76] Inventor: Robert S. Casper, 104 Maple La., Levelgreen, Trafford, Pa. 15085

[21] Appl. No.: 874,679

[22] Filed: Feb. 3, 1978

[51] Int. Cl.² ............................................. A01K 87/00
[52] U.S. Cl. ........................................ 43/21.2; 43/25
[58] Field of Search ............................ 43/21.2, 23, 25

[56] References Cited

U.S. PATENT DOCUMENTS

| 2,158,104 | 5/1939 | Bowen | 43/25 |
| 2,494,159 | 1/1950 | Bernstein | 43/23 |
| 2,869,276 | 1/1959 | Hagen | 43/25 |
| 3,367,056 | 2/1968 | Johnson | 43/25 |

FOREIGN PATENT DOCUMENTS

| 1553055 | 11/1967 | France | 43/21.2 |
| 76424 | 3/1950 | Norway | 43/25 |
| 20882 | 7/1897 | United Kingdom | 43/21.2 |

Primary Examiner—Nicholas P. Godici
Attorney, Agent, or Firm—John B. Sotak

[57] ABSTRACT

A forearm rest for assisting an angler in holding a spinning type of fishing rod and for allowing the angler to freely cast without hinderance. The forearm rest includes a long narrow arcuate portion extending outwardly from the handle for accommodating the forearm of the angler and includes a handle attaching portion for secure connection to a desired position along the handle of the fishing rod.

10 Claims, 6 Drawing Figures

FOREARM REST FOR FISHING RODS

FIELD OF THE INVENTION

This invention relates to a fishing rod rest and more particularly to a forearm rest or supporting device having a rod engaging portion for attachment to the handle of the fishing rod and having a laterally extending portion projecting normal to the longitudinal axis of the rod for accommodating the forearm of an angler to assist the angler in holding the fishing rod when he is awaiting a bite or when he is reeling in the fishing line and for readily clearing the forearm of the angler when he is casting the lure or bait.

BACKGROUND OF THE INVENTION

In the sport of fishing, it is normal for a fisherman to spend endless hours in attempting to catch the sought after aquatic craniate vertebrate. After several hours of casting, trolling and just plain fishing, the fisherman becomes quite weary in holding the fishing rod with only one hand, and he usually seeks relief by holding the rod with both hands, or alternatively, he lays the rod down or mounts it in a holder planted in the ground or fixed to the side or back of a boat. A great amount of stress and strain is placed on the hand, wrist and arm of the fisherman as he manipulates the fishing rod in his endeavor to catch a prize fish or even to snare a tidbit panfish. Also, it has been found that people with arthritis or the like as well as handicapped individuals experience physical difficulty, pain and/or mental anguish in their attempts to enjoy the sport of fishing. Previous mechanisms and devices for relieving this agonizing discomfort and weary feeling which every fisherman has experienced at one time or another have not been totally successful for one reason or another. That is, none of these prior art devices were wholly satisfactory since they were possessed of one or more shortcomings. For example, while various braces, holders and supports have been proposed in the past, many of the previous devices hindered and interfered with the fisherman's ability to spin and cast while other braces, holders and supports were awkwardly located and resulted in the unnatural positioning of the hand, wrist and arm of the fisherman. In either case, many anglers readily recognized the deficiencies and would not even entertain purchasing such previous devices, or if purchased, the fisherman soon became disenchanted and quickly discarded the prior art forearm aiding devices. In order to win the wholehearted acceptance of the many fisherman, a rod supporting device must not restrict or interfere with the manuverability of the angler to cast out his lure or bait and also must allow the fisherman to hold his rod in a normal and comfortable position. Generally, a fisherman holds the handle of a spin casting type of rod in the palm of his hand while biding his time and waiting for a bite or leisurely manipulates the tip of the rod as he winds in the line. In this rod holding position, the forearm is generally slightly off to one side of the rod forming an acute angle therebetween. Anterior types of fishing rod supporting devices, such as, those shown and disclosed in U.S. Pat. Nos. 2,244,408; 3,367,056 and 4,014,129 and French Pat. No. 1,553,055 employed U-shaped cradle members which were directly mounted to the top of the handle and in-line with the longitudinal axis of the fishing rod or pole. Such previous arrangements were not only uncomfortable for the fisherman to hold the rod due to the unnatural positioning of his arm which caused and placed undue stress and strain on the forearm and bicep muscles. In many cases, the fisherman would suffer from cramps or muscular constrictions and at the very least he would experience tension and exertion which soon made him weary and tired. In addition, such previous in-line cradle supports also interfered with the ability of the fisherman to cast his lure or bait since the fisherman's forearm had the tendency to strike and hit the cradle portion during the casting motion. Thus, it will be appreciated that an acceptable and successful forearm rest for a fishing rod must allow the angler to assume a natural and comfortable gripping position yet must not impede with the free casting ability of the angler.

OBJECTS OF THE INVENTION

Accordingly, it is an object of this invention to provide a new and improved forearm rest for a fishing rod.

Another object of this invention is to provide a unique fishing rod arm rest which naturally supports the forearm of a fisherman and which unrestrictively allows the fisherman to cast his line.

A further object of this invention is to provide a novel forearm supporting device for a spinning rod which relieves the stress and strain on the arm of an angler.

Yet another object of this invention is to provide an improved forearm supporting device for assisting the fisherman in retrieving his lure and in landing his catch.

Yet a further object of this invention is to provide a new supporting device for a fishing rod which allows an angler to fish with less fatigue and in greater comfort.

Still another object of this invention is to provide an arm rest which is attached to the handle of a spinning rod and which is adapted to readily accommodate the forearm of the angler.

Still a further object of this invention is to provide a rest for aiding an angler in holding a fishing rod having a first means for connection to the handle of the fishing rod, and a second means adapted to extend laterally to one side of the handle of the fishing rod, the second means being arcuately shaped to fit the forearm of the angler wherein the forearm forms an oblique angle with the longitudinal axis of the fishing rod for preventing stress and strain of the arm of the angler yet permitting unimpeded movement during casting.

An additional object of this invention is to provide an improved forearm rest for a fishing rod which is economical in cost, simple in construction, quick to install, durable in service, facile to use and easy to operate.

SUMMARY OF THE INVENTION

In accordance with the present invention there is provided a unique forearm supporting device for aiding a fisherman to hold his fishing rod during trolling, still fishing and retrieving and for freely allowing the fisherman to cast his lure or bait without interference. The forearm supporting device includes a long narrow piece of material having a handle attachment portion and a forearm accommodating portion. The long narrow piece of material may be a strip of metal which may be bent to the desired shape by a suitable bending machine or metal forming device or jig. The forearm accommodating portion preferably takes the form of an arcuate or U-shaped section which extends outwardly and normal to the longitudinal axis of the fishing rod. In one embodiment, the handle attachment portion takes the form of a circular band or ring which encompasses the handle of the fishing rod. After proper positioning, the supporting device is clamped onto the handle of the fishing rod by tightening a fastener, such as, a suitable self-tapping screw, which causes the compression of the circular band or ring. In another embodiment, the handle attachment portion takes the form of a dimpled or tongued rectangular spring tang or tab which fits and plugs into a selected one of a plurality of matching notches or holes formed along the length of the handle of the fishing rod. In practice, the fisherman normally holds the handle of the fishing rod in the palm of his hand and has the underside of his forearm resting in the arcuate or U-shaped section. Thus, the fisherman assumes a natural and comfortable position with his forearm making a slight or acute angle with respect to the longitudinal axis of the fishing rod. Further, the supporting device does not in anyway interfere with the ability of the fisherman to cast his bait or lure since the supporting device extends outwardly away from the forearm of the fisherman. Thus, during casting or throwing of the line, the forearm of the fisherman is allowed to clear and freely pass by the inner side of the handle and supporting device without interference.

DESCRIPTION OF THE DRAWINGS

Other objects, features and advantages of this invention will become more clearly apparent from the following detailed description when read in conjunction with the accompanying drawing wherein.

DETAILED DESCRIPTION OF THE INVENTION

Figure 1:
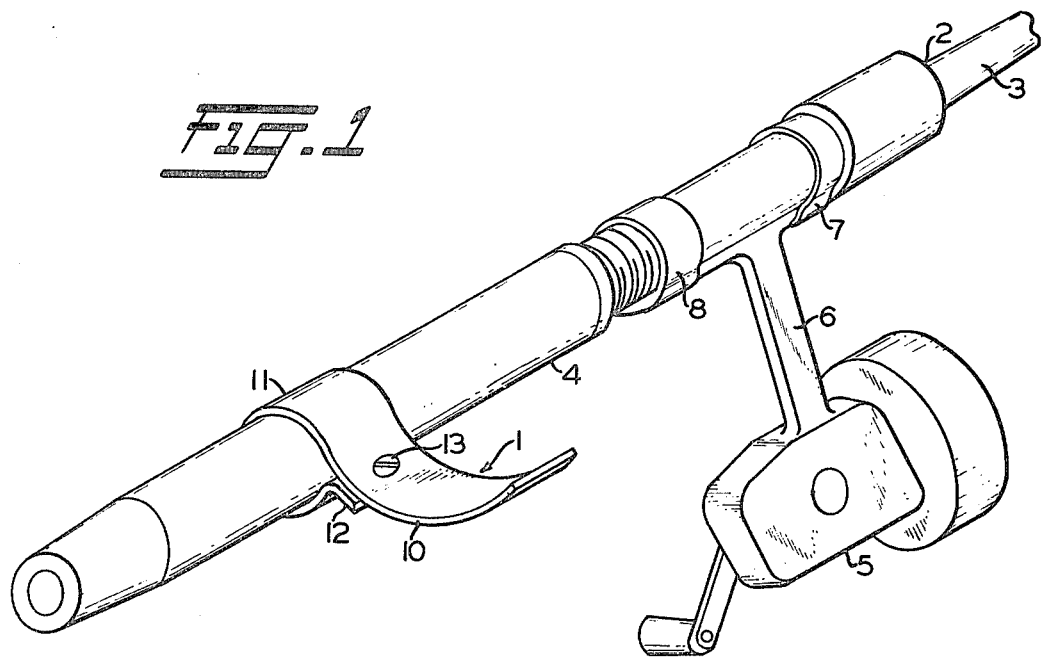
FIG. 1 is a perspective view of a spinning type of fishing rod and reel having a first forearm rest or supporting device constructed in accordance with the present invention.
Figure 2:
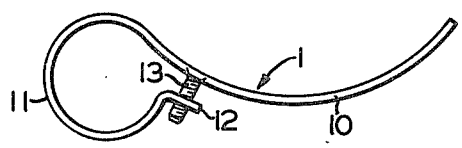
FIG. 2 is a view in end elevation of the forearm rest or supporting device shown in FIG. 1.

Referring now to the drawings and in particular to FIGS. 1 and 2, there is shown one embodiment of the present invention. In viewing FIG. 1, it will be seen that the forearm rest or supporting device which is generally characterized by numeral 1 is combined with a spinning type of fishing rod 2. The spinning rod 2 includes an elongated flexible shaft 3 and a hand gripping portion or handle 4. A spinning reel 5 includes a T-shaped extension or bracket 6 which is securely mounted to the forward end of the handle 4 by a pair of conventional fixed and movable clamping rings 7 and 8, respectively. As shown in FIG. 1, the supporting rest 1 is situated and mounted near the rearward end of the handle 4 of the spinning rod 2. In practice, the forearm rest 1 is formed from a single piece of sheet metal, such as, a long narrow band or strip of sheet aluminum. Actually, the rest is made of a 1/16 inch strip of 5052-H32 sheet aluminum having a width of approximately one inch and having a length of approximately seven inches.

The flat aluminum strip is placed into a metal bending machine or suitable metal forming device which forms an arcuate or U-shaped portion 10 and circular band or ring-like portion 11. The radius of curvature of the arcuate portion 10 is preferably large enough to readily accommodate the forearm of an angler or fisherman with ease and comfort. Similarly, the diameter of the ring portion 11 is selected and chosen to fit over the cork or rubber covered handles or even the wooden handles of most commercially available spinning rods. As shown in FIG. 2, the terminal portion 12 of the ring 11 is arranged to be substantially paralled to the curvature of portion 10. A hole is then drilled through both the arcuate portion 10 and the terminal portion 12. The hole in portion 10 is countersunk to accommodate the conical shape of a self-tapping flat head screw 13.

It will be seen that the forearm rest 1 is fitted into the handle 4 and is suitably moved and shifted along the length thereof to the desired and appropriate position. The forearm rest 1 may be rotated about the longitudinal axis of the rod 2 and is located substantially 90 degrees in relationship to the reel bracket 6. After the rest 1 is suitably positioned, the self-tapping crew 13 is appropriately turned and tightened with a coin or screwdriver to securely attach the forearm rest 1 in place on the handle 4.

Figure 3:
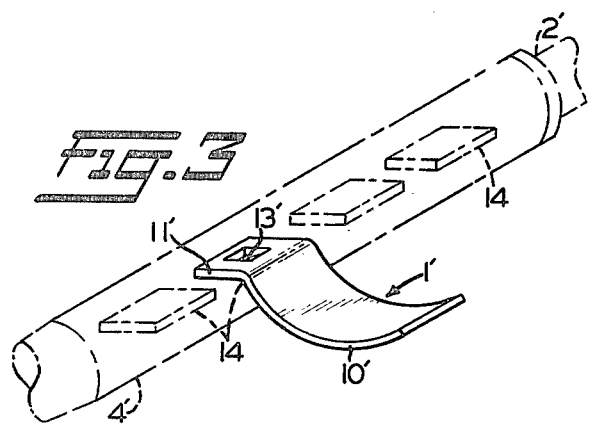
FIG. 3 is a perspective view of a second forearm rest or supporting device for a spinning type of fishing rod which is shown phantom.

In viewing FIG. 3, it will be noted that there is shown another embodiment of the present invention. The forearm rest or supporting device is generally characterized by numeral 1'. The forearm rest or support 1' is also preferably fabricated from 5052-H32 sheet aluminum which is relatively ductile for being readily bent and is sufficiently rigid after bending to maintain its shape even under abnormal conditions. As shown, the forearm rest 1' is bent and shaped to form an arcuate forearm receiving portion 10'. It will be noted that the handle attaching portion consists of a rectangular tang or tab 11' having a dimple or spring tongue 13' punched out of the sheet aluminum. It will be observed that a plurality of rectangular slots or openings 14 are formed along the length of the handle 4' of the spinning rod 2'. Thus, the tang or tab 11' may be inserted and snapped into a selected one of the plurality of slots 14 by the fisherman as desired. The dimple or spring tongue 13' locks the rest 1' in the desired position.

Figure 6:
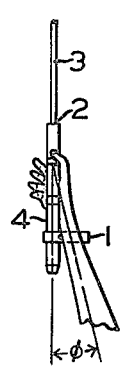

It wil be appreciated that the two illustrated embodiments are adapted for right-handed anglers or fishermen since the rests 1 and 1' extend outwardly to the right side of the rod as viewed in the drawing. Thus, the underside at the right forearm of the fisherman is arranged to comfortably rest on the upper surface of the arcuate portion 10, 10' when still fishing, trolling or retrieving. Thus, the engagement of the forearm with the supporting device or rest and the gripping of the handle by the fingers or palm of the hand of the fisherman provides a two point holding or supporting arrangement for more readily retaining the fishing rod as shown in FIG. 6. In viewing FIG. 6, it will be seen that the arm of the angler assumes a natural position and forms an oblique or acute angle $\phi$ with respect to the longitudinal axis of the fishing rod 2. Thus, the angler may fish in comfort and with for many many hours since the stress and strain on his fingers, hand, wrist and arm is completely removed or relieved by the supporting action of the forearm rest 1.

Figure 4:
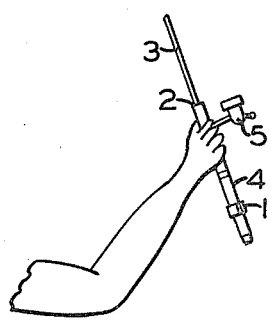
FIGS. 4, 5 and 6 are fragmentary diagrammatic views illustrating the use of the present invention during different stages of angling, such as, casting, trolling, still fishing or retrieving.
Figure 5:

Further, the forearm rest or supporting device 1, 1' does not impede or interfere with the casting of the fisherman. As shown in FIGS. 4 and 5, the arm of the angler is slightly disposed to the left of the handle 4 during the normal casting of the lure or baited hook. Thus, since the entire forearm rest 1 extends outwardly or away from the handle of the fishing rod 2, there will be no obstruction or impediment in the way of the arm of the angler when he is in the act of casting or attempting to cast as shown in FIG. 5. Accordingly, the unique forearm rest of the present invention aids the fisherman in holding the fishing rod for more enjoyable and relaxed fishing and yet allows him to freely cast without restriction.

Accordingly, the present invention results in an improved and advantageous benefit for anglers of all ages at a nominal cost and with a minimum effort. It will be appreciated that the forearm rest is adaptable to both right-handed and left-handed anglers. The forearm rest 1 may be removed from handle 4 and rotated or turned about 180 degrees and repositioned on handle 4 to accommodate a left-handed fisherman. Similarly, forearm rest of supporting device 1' may be positioned into one of a plurality of slots which may be formed in the left side of the handle 4' to accommodate a left-handed fisherman.

It is understood that certain changes and modifications may be made to the presently described forearm rest without departing from the spirit and scope of the invention. For example, a different sheet metal, such as, steel, brass, copper or the like, may be used in place of the sheet aluminum. Further, the rest or supporting device may be cast or extruded from metal or even plastic with similar results. In addition, the length, width and thickness may be varied in accordance with a number of variables, such as, the size, weight and height of the angler, the type of material of the rest, the type and model of the fishing rod, etc. Also, the radius of curvature of portion 10 may be varied and the handle attachment portion 11, 11' may be changed as desired.

It will be apparent to those skilled in the art that other changes, variations and alterations of the supporting device shown and described may be made without departing from the spirit and essence of the invention, and therefore it is understood and intended that all equivalents and incidental modifications are herein meant to be covered by the appended claims.

Having now described the invention what I claim as new and desire to secure by Letters Patent, is:

1. The combination of a fishing rod, a reel mounted thereon and a rest for aiding an angler in holding the fishing rod comprising, said rest formed from a strap-like member and having first means for connection between the reel and the rearward end of the handle of the fishing rod, said rest having second means adapted to extend laterally to one side of the handle of the fishing rod and being shaped as a single arcuate portion which forms a continuous smooth integral part with said first connection means, said second acruate means fitting and engaging the forearm of the angler so that the forearm forms an oblique angle with the longitudinal axis of the fishing rod for preventing stress and strain on the arm of the angler yet so that the forearm disengages and clears said second arcuate means for permitting unimpeded movement by the angler during casting.

2. The combination of a fishing rod, a reel mounted theron and a rest for aiding an angler in holding the fishing rod as defined in claim 1, wherein said first connection means includes a ring-like portion which substantially encircles the handle of the fishing rod.

3. The combination of a fishing rod, a reel mounted thereon and a rest for aiding an angler in holding the fishing rod as defined in claim 1, wherein said first connection means includes a tongue portion which fits into a selected one of a plurality of slots formed in the side of the handle of the fishing rod.

4. The combination of a fishing rod, a reel mounted thereon and a rest for aiding an angler in holding the fishing rod as defined in claim 1, wherein said second arcuate means fits the underside of the forearm of the angler.

5. The combination of a fishing rod, a reel mounted thereon and a rest for aiding an angler in holding the fishing rod as defined in claim 1, wherein said first connection means and said second arcuate means are formed from a long narrow piece of sheet metal.

6. The combination of a fishing rod, a reel mounted thereon and a rest for aiding an angler in holding the fishing rod as defined in claim 1, wherein said second arcuate means extends substantially perpendicular to the longitudinal axis of the fishing rod.

7. The combination of a fishing rod, a reel mounted thereon and a rest for aiding an angler in holding the fishing rod as defined in claim 1, wherein said first connection means includes a circular band-like portion which is compressed around the handle of the fishing rod by a screw fastener.

8. The combination of a fishing rod, a reel mounted thereon and a rest for aiding an angler in holding the fishing rod as defined in claim 1, wherein said second arcuate means extends toward the outward side of the handle of the fishing rod to insure that the angler is free to cast without being impeded.

9. The combination of a fishing rod, a reel mounted thereon and a rest for aiding an angler in holding the fishing rod defined in claim 1, wherein said first connection means and said seond arcuate means are bent into the desired shape.

10. The combination of a fishing rod, a reel mounted thereonand a rest for aiding an angler in holding the fishing rod as defined in claim1, wherein said first connection means and said second arcuate means are prefabricated from a single piece of sheet metal.

* * * * *